Aug. 31, 1937.                H. P. HINDS                2,091,852
           CONSTRUCTION FOR JOINING METALLIC AND NONMETALLIC MEMBERS
                        Original Filed June 22, 1932
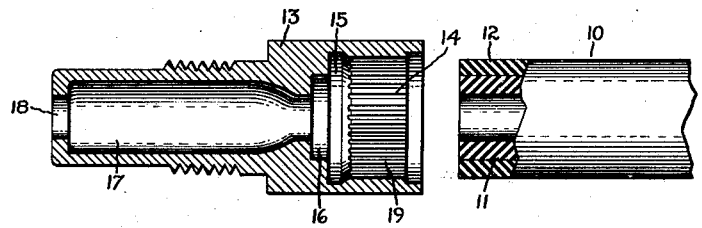
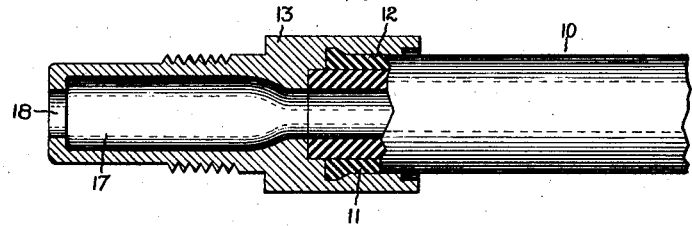
Inventor:
Henry P. Hinds,
by Harry E. Dunham
His Attorney.

Patented Aug. 31, 1937

2,091,852

UNITED STATES PATENT OFFICE 2,091,852

CONSTRUCTION FOR JOINING METALLIC AND NONMETALLIC MEMBERS

Henry P. Hinds, Providence, R. I., assignor to General Electric Company, a corporation of New York Original application June 22, 1932, Serial No. 618,817, now Patent No. 2,059,867, dated November 3, 1936. Divided and this application January 2, 1936, Serial No. 57,109

4 Claims. (Cl. 285—74)

My present invention relates to joints and more particularly to an improved construction for joining a metal member to a non-metallic member in a manner to insure permanently a tight connection between the members under all normal service conditions.

The present application is a division of my earlier application, Serial No. 618,817, filed June 22, 1932, now matured into Patent No. 2,059,867, November 3, 1936, and entitled "Method of and means for securing a metal member to a fibrous tube", which earlier application is assigned to the assignee of the present invention.

In the electrical industry and frequently in other industries it becomes desirable to rigidly secure a metal member to a non-metallic member in order to take advantage of the characteristics of the particular non-metallic member where the characteristics of the metal member make it unsuitable. In the electrical industry this most frequently happens when it is necessary to insulate two metal parts from each other electrically and at the same time connect them together mechanically. When it is only necessary to separate the metal parts by a small distance to insulate for relatively low voltages the problem is generally simple but when high voltages are to be encountered and the non-metallic member is to be called upon to withstand mechanical stresses the problem may be very serious. The principal difficulty encountered is in maintaining a tight joint which is permanent and which will withstand repeated mechanical stresses. One of the characteristics of most non-metallic members which raises the difficulty of making a tight joint with a metal member is the relatively great change in dimensions with temperature or atmospheric changes as compared with the changes in metal under similar conditions. If the metal member surrounds the non-metallic member then on a rise in temperature or other atmospheric change the internal stress in the non-metallic member may cause it to fracture at the joint. Also the joint may be loosened on a fall in temperature or atmospheric change.

In the manufacture of fuse holders, especially fuse holders for high tension circuits, this problem generally arises because it is necessary to secure metal contacts or ferrules to one or both ends of a tube of fibrous material. By fibrous material is meant paper, fabric, wood, asbestos, or other non-metallic material which has a fibrous structure. Fibrous material in addition to possessing the undesirable characteristics as mentioned in connection with non-metallic materials in general also absorbs water or moisture in large quantities which causes it to swell thus increasing the difficulty of making a tight joint between it and a metal member. A tight joint between the contact and tube is important because when a fuse blows within it high pressure gases are generated which if allowed to escape through the joint between the contact and tube would reduce the efficiency of the fuse holder and fuses of the expulsion type where the high gas pressure must be retained long enough to rapidly quench the arc which is established by the fuse blowing action and also to rapidly expel all the parts freed by the blowing of the fuse through the proper opening provided for that purpose.

An important object of my invention is, therefore, the provision of an improved joint between a metal part, such as an electrical contact, and a member of fibrous material, such as a fuse holder tube.

Other objects of my invention and the manner in which the invention is carried out will be understood by reference to the following specification when considered in conjunction with the accompanying drawing in which Fig. 1 is a view in side elevation, partly in section, of a metallic contact and non-metallic tube before they are secured together, and Fig. 2 is a similar view in elevation with the contact and tube secured together.

In the drawing, 10 indicates a composite tube of insulating material comprising an inner solid wall tube or lining 11 of vulcanized fibrous material covered by an outer tube 12 of laminated fibrous material. The solid wall tube or lining 11 is used to obtain the arc resisting quality necessary. Outer tube 12 is formed by winding sheet material, such as cloth, paper, or the like, on the inner tube 11 as a core. The outer surface of the inner tube 11 is first roughened by abrasives or by knurling. The sheet material is covered on one side with a binder, such as shellac, synthetic resin, or the like. This sheet material is then tightly wound on the tube 11 after being passed over a heated apron to soften the binder. Pressure may be applied while the sheet material is wound on the tube 11. The outer laminated tube 12 may then be cured by the application of heat or it may be cured slowly merely by exposure to the atmosphere. In either case a contact 13 is secured to the composite tube 10 while the outer tube 12 is still in the uncured state. After the tube 12 is cured it becomes very tough and will absorb only a small amount of moisture relative to other fibrous materials. Also, it does not expand or contract very much with changes in temperature or atmospheric changes, nor will it soften when subjected to relatively high temperatures. Contact 13 is provided with an opening 14 at one end which may be the same or slightly larger in diameter than the outside diameter of the composite tube 10. This opening 14 communicates with a groove 15 of somewhat larger diameter than opening 14. Opening 14 is provided with ribs 19 on its surface. Communicating with groove 15 is a cylindrical opening 16 of the same or a slightly larger diameter than the inner tube 11. As shown in the drawing, contact 13 is provided with a chamber 17 having an opening 18 at the opposite end of the contact.

To secure the contact or metal member 13 to the tube 10, member 13 is first heated to a temperature that is sufficiently high so that when the tube 10 is inserted in it enough heat will be imparted to the outer laminated tube 12 which is in the uncured state, to soften it. The tube 10 is then placed adjacent to and in line with opening 14 of the metal member 13. When the heat applied to the metal member 13 has somewhat softened the outer laminated tube 12, pressure is applied to the contact 13 and tube 10 at the ends opposite the juxtaposed ends in a direction to force them toward each other. This pressure forces the tube 10 into opening 14 and causes the end of the outer tube 12 to slide back from the end of tube 11 permitting it to enter the smaller opening 16, the displaced end of the outer tube 12 being forced into the groove 15 between openings 14 and 16. This pressure also causes the softened outer tube 12 to extend into the spaces between ribs 19 provided on the surface of opening 14 to prevent subsequent relative rotation between the contact and tube. The continued application of heat to the metal member or contact 13 and the subsequent cooling cures and hardens the outer tube 12 which locks the tube and metal member together.

By securing the metal contact member to the tube with the outer covering of laminated sheet material, a tight joint is made between the two which is not loosened by changes in temperature and other atmospheric conditions and also the possibility of fracture of the tube by swelling of the tube due to the absorption of moisture is eliminated. In addition, by this method the joint between the metal member and the tube can be made very tight at the outset without the necessity for clearance to allow for uneven expansion and contraction of the metal and the tube. As pointed out above, the expansion and contraction with temperature and other atmospheric changes of the laminated tube is not excessive.

While I have illustrated and described my invention in connection with fuse holders for fastening a metal member to a fibrous tube, it is to be understood that this is only by way of example and that the invention is not necessarily limited thereto.

What I claim as new and desire to secure by Letters Patent of the United States is:

1. In an article of manufacture, a metal member having two communicating substantially aligned recesses of different size, the end wall of the larger of the recesses adjacent the opening into the smaller of the recesses providing a shoulder and the side walls of said larger recess having a circumferentially extending groove adjacent said shoulder, means providing a shoulder at the end of said smaller recess opposite said opening, and a tubular non-metallic member extending into said larger recess into abutment with said first shoulder and firmly engaged by the side walls of the larger recess, said tubular member having a reduced end portion extending into said smaller recess into abutment with said second shoulder and firmly engaged by the walls of the smaller recess, the tubular member having also a circumferential flange in locking engagement with said groove.

2. In an article of manufacture, a metal member having a pair of substantially aligned communicating openings of different diameters, the side wall of the larger of said openings having a recess formed therein, a tubular member of less outside diameter than said larger opening extending through the larger opening into tight engagement with the smaller of the openings, and a body incorporating hardened plastic material formed tightly on said tubular member disposed in and sealing the space between the tubular member and the wall of said larger opening, a portion of said body of material extending into locking engagement with said recess to insure against relative movement between said members.

3. An article of manufacture comprising a tube having a solid wall lining covered by laminated material with a binder between the layers of material, and a metal member secured to one end of the tube having an opening of substantially the same diameter as the outside diameter of the tube and into which the tube extends, a second opening of substantially the same diameter as the outside diameter of said lining communicating with said first mentioned opening and having a projecting portion of said lining extending thereinto, and a groove between said openings of larger diameter than the first mentioned opening, the laminated material extending into the groove to lock the metal member and tube together.

4. An article of manufacture comprising a tube having a solid wall lining surrounded by a laminated sheet material with a binder between adjacent layers of sheet material, and a metal member secured to one end of the tube having an opening of substantially the same diameter as the outside diameter of the tube and into which the tube extends, the inner wall of said opening having a ribbed surface, a second opening of substantially the same diameter as the outside diameter of the lining communicating with said first mentioned opening and a groove between said openings of a larger diameter than the first mentioned opening, the lining extending into said second opening, and the laminated material extending into the groove between the openings and engaging said ribbed surface to lock the metal member and tube together.

HENRY P. HINDS.